Sept. 6, 1927.
F. J. HARDMAN
ENGINE STARTING APPARATUS
Filed June 24, 1926
1,641,426
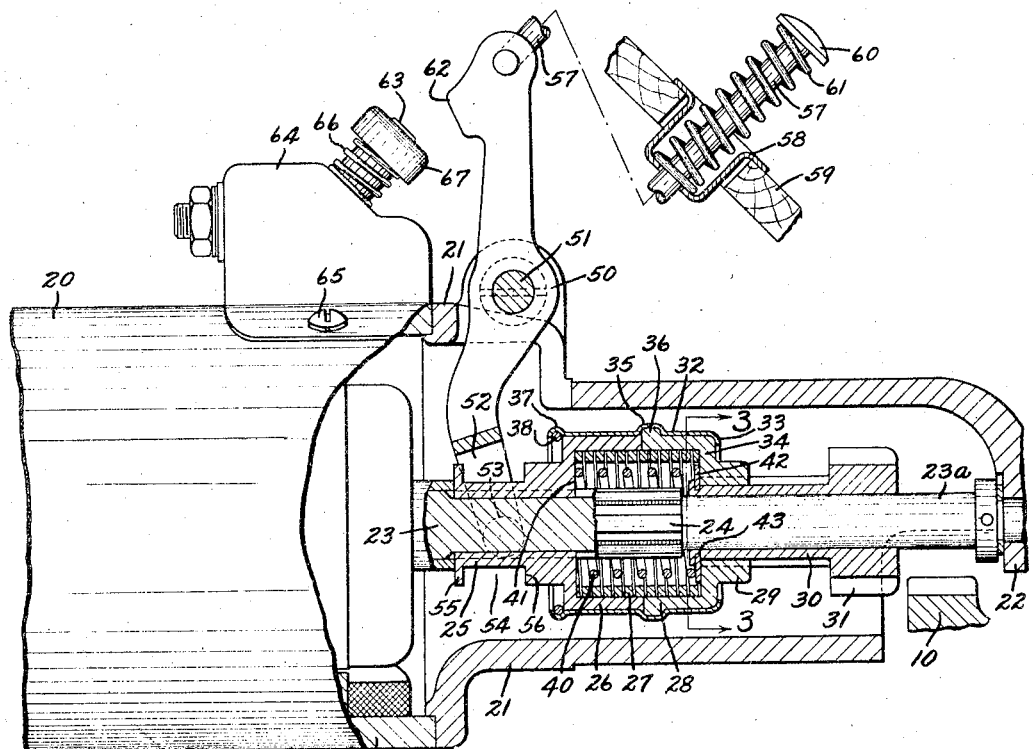
Fig. 1
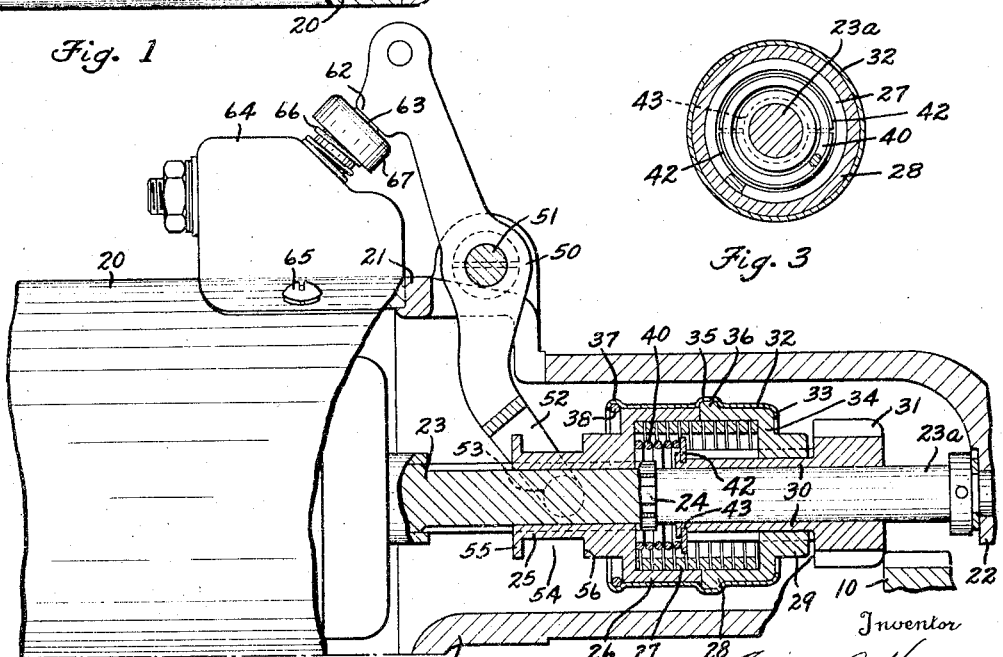
Fig. 2
Fig. 3
Inventor
Frederick J. Hardman
By
Spencer, Duvall & Hardman
his Attorneys Patented Sept. 6, 1927.

1,641,426

UNITED STATES PATENT OFFICE.

FREDERICK J. HARDMAN, OF DAYTON, OHIO, ASSIGNOR, BY MESNE ASSIGNMENTS, TO DELCO-REMY CORPORATION, OF DAYTON, OHIO, A CORPORATION OF DELAWARE.

ENGINE-STARTING APPARATUS.

Application filed June 24, 1926. Serial No. 118,244.

This invention relates to apparatus for starting internal-combustion engines, and particularly to the type of apparatus which includes an electric motor, a pinion driven by the motor through a one-way clutch and movable endwise into engagement with the gear of an engine to be started.

It is among the objects of the invention to provide certain improvements in this type of apparatus in order that its construction may be simplified and so that it may be produced at lower cost.

Further objects and advantages of the present invention will be apparent from the following description, reference being had to the accompanying drawings, wherein a preferred form of the present invention is clearly shown.

In the drawings:

Figs. 1 and 2 are fragmentary side views partly in section of a form of starting apparatus embodying the present invention, Fig. 1 showing the apparatus in normal position and Fig. 2 showing the apparatus at the instant of closing the motor switch and prior to meshing the motor pinion with the engine gear; and Fig. 3 is a sectional view on line 3—3 of Fig. 1.

Referring to the drawings, 20 designates the field frame of an electric motor to which is attached a gear housing 21 providing a bearing 22 for an armature shaft 23. The left-hand end of the shaft 23 is supported by a bearing (not shown, supported by the field frame 20 in the usual manner. The armature shaft 23 is provided with splines 24 cooperating with the internally-splined hub 25 of a clutch cylinder 26 which is slidable endwise along the shaft 23 and is driven thereby. A helical coil spring 27 provides a one-way friction driving connection between the driving clutch cylinder 26 and a driven clutch cylinder 28 which is coaxial with the cylinder 26 and of the same internal diameter. The cylinder 28 has an internally-splined hub 29 which cooperates with the externally-splined hub 30 of a pinion 31 which is movable along the portion 23ª of shaft 23. As shown, the portion 23ª is of smaller diameter than that portion of the shaft 23 which is provided with splines 24. The clutch cylinders 26 and 28 are maintained in assembled relation, as shown, by a sleeve 32 having an end flange 33 bearing against an end wall 34 of the clutch cylinder 28, having an intermediate portion 35 which has been formed around an annular boss 36 provided by the cylinder 28, and having an end flange 37 which provides a groove for a resilient wire split ring 38.

Motion is transmitted from the clutch member 26 to the pinion 31 in a direction to mesh the pinion 31 with the engine gear 10 through a spring 40 which is located within the clutch cylinders and the clutch spring 27. One end of the spring 40 bears against an end wall 41 of the clutch member 26 and the other end bears against a pair of C washers 42 which are maintained by the spring 27 within an annular groove 43 provided by the hub 30 of the pinion 31. Motion is non-yieldingly transmitted from the clutch member 26 to the pinion 31 in a direction to withdraw the pinion 31 from the gear 10 through members including the end wall 41 of the clutch 26, the wire split ring 38, the sleeve 32, and end wall 34 of the clutch member 28, the C washers 42 and the hub 30 of pinion 31.

The clutch and pinion are moved endwise by a shifting lever 50 pivoted upon a rod 51 attached to the housing 21. The lower end of the lever 50 is bifurcated to provide arms 52 each carrying a roller or stud 53 which is received by a groove 54 defined by a flange 55 and a shoulder 56 formed integrally with the hub 25 of the clutch member 26. The upper end of the lever 50 is attached to a pedal rod 57 which projects through a cup-shaped member 58 attached to the floorboard 59 of an automobile. The upper end of the rod 57 is attached to a pedal 60. A spring 61 which is located between the cup 58 and the pedal 60 tends to maintain the lever, the clutch and the pinion in the position shown in Fig. 1. The lever 50 carries a lug 62 for engagement with the plunger 63 of a starting motor switch which is housed within a case 64 attached by one or more screws 65 to the motor frame 20. A spring 66 located between the case 64 and a collar 67 tends to maintain the plunger 63 in switch-open position.

To start the engine, the pedal 60 is pressed downwardly to cause the lever 50 to move in a counterclockwise direction and the clutch and pinion to be shifted toward the right, as viewed in Figs. 1 and 2. If gear tooth abutment does not occur, the switch plunger 63 will be engaged by the lug 62 of lever 50 after the pinion 31 has been substantially meshed with the engine gear 10. When the engine becomes self-operative and the pinion 31 is driven by the engine gear 10 at a rate in excess of the rate at which it can be driven by the electric motor, the clutch 28 will overrun the clutch 26, due to the one-way driving connections provided by the helical coil spring which frictionally engages the interior cylindrical surfaces of the clutch members 26 and 28. If the teeth of the pinion 31 should abut the teeth of gear 10, thereby preventing further movement of the pinion toward the right, as shown in Fig. 2, the operator will continue to press downwardly upon the pedal 60 in order to move the lever 50 into position for closing the motor switch, as shown in Fig. 2. This operation will cause the spring 40 to be compressed to a degree greater than its initial state of compression so that, when the pinion 31 has been rotated by the motor into meshing registration with the gear 10, the spring 40 will be released in order to move the pinion 31 quickly into mesh with the gear 10. When the pedal 60 is released, the spring 61 will return the lever 50 and clutch members 26 and 28 to the position shown in Fig. 1, and during the return movement of these members the pinion will be withdrawn from the engine gear due to the non-yielding connections including the parts 38, 32, 34, 42 and 30, as has been described.

It will be noted that the pinion is splined to the driven clutch cylinder, and that the spring 40 is located between one of the clutch members and the pinion. By this construction, the only mass to be moved by the spring 40 is the pinion 31. The construction shown permits reducing the diameter of the shaft portion which supports the pinion, consequently, the pinion diameter may be reduced. Therefore, the pinion may be made relatively light in weight so that the inertia to be overcome by the spring 40 is relatively small. Thus it is possible for the spring 40 to move the pinion 31 a substantial distance into mesh with the gear 10 before the shaft 23 has attained maximum driving speed. By placing the pinion 31 into mesh with the gear 10 before the maximum speed of the motor has been attained the liability to breakage of gear teeth, especially the entering faces of the gears, is substantially minimized. Since the central bore of the pinion has been reduced, the number of teeth of the pinion may likewise be reduced, with the result that the cranking gear ratio may be increased and a smaller motor may be used.

The clutch provides a housing for the spring 40 and prevents excessive radial expansion of the spring, due to centrifugal force. The spring 27 has an additional function of a retainer for the C washers 42 which provide a stop limiting the separation of the pinion from the clutch. Since certain parts have been made to serve a double purpose, the total number of parts has been materially reduced and the construction simplified.

The clutch and pinion assembly may be readily assembled and disassembled. To disassemble these parts, the wire split ring 38 is pried out of the groove provided by the flange 37 of the sleeve 32. Then the clutch cylinder 26 may be withdrawn from the sleeve 32 and the springs 27 and 41 may be removed. This permits lateral movement of the C washers 42 relative to the pinion hub 30, so that these washers may be withdrawn from the groove 43. Then the pinion may be disassembled from the clutch member 28.

While the form of embodiment of the invention as herein disclosed, constitutes a preferred form, it is to be understood that other forms might be adopted, all coming within the scope of the claims which follow.

What is claimed is as follows:

1. Engine starting apparatus comprising, in combination, an electric motor, a switch controlling the motor, a splined shaft driven by the motor, a driving clutch cylinder slidably splined to the shaft, a driven clutch cylinder in alignment with the driving cylinder, a helical coil spring providing a one-way drive between the cylinders, a pinion slidable along the shaft into mesh with the gear of an engine to be started and having its hub slidably connected with the driven cylinder, means for moving the clutch cylinders and for closing the switch, a spring for transmitting endwise motion in one direction from the clutch to the pinion, the spring yielding in case of tooth abutment to permit closing the switch, and means for non-yieldingly transmitting motion to the pinion from the clutch in the opposite direction.

2. Engine starting apparatus according to claim 1, in which the second-mentioned spring is located within the clutch cylinders and between the driving clutch cylinder end wall and a portion of the pinion hub which projects within the driven clutch cylinder.

3. Engine starting apparatus according to claim 1, in which the second-mentioned spring is located within the clutch cylinders and between the driving clutch cylinder end wall and a portion of the pinion hub which projects within the driven clutch cylinder, in which the driven clutch cylinder is provided with an internally-splined hub and the pinion has an externally-splined hub cooperating with the clutch hub and extending within the driven clutch cylinder where it receives pressure from said spring.

4. Engine starting apparatus according to claim 1, in which the driven clutch cylinder is provided with an internally-splined hub and the pinion has an externally-splined hub cooperating with the clutch hub and extending within the driven clutch cylinder, said hub being provided with an annular groove which receives a pair of C-washers which prevent withdrawal of the pinion hub from the hub of the driven clutch member, and in which the clutch spring is located within the clutch cylinders and prevents movement of the C-washers from the groove.

In testimony whereof I hereto affix my signature.

FREDERICK J. HARDMAN.